(12) United States Patent
Bodum

(10) Patent No.: US 9,107,541 B2
(45) Date of Patent: Aug. 18, 2015

(54) BEVERAGE MAKER HAVING A LOCKABLE ACTUATION ROD

(75) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 435 days.

(21) Appl. No.: 13/636,861

(22) PCT Filed: Aug. 3, 2010

(86) PCT No.: PCT/CH2010/000189
§ 371 (c)(1),
(2), (4) Date: Sep. 24, 2012

(87) PCT Pub. No.: WO2011/014972
PCT Pub. Date: Feb. 10, 2011

(65) Prior Publication Data
US 2013/0010568 A1    Jan. 10, 2013

(30) Foreign Application Priority Data
Apr. 8, 2010    (CH) .......................................... 508/10

(51) Int. Cl.
| A47J 43/10 | (2006.01) |
| A47J 31/00 | (2006.01) |
| A47J 31/44 | (2006.01) |
| A47J 43/042 | (2006.01) |

(52) U.S. Cl.
CPC ................. *A47J 43/105* (2013.01); *A47J 31/00* (2013.01); *A47J 31/44* (2013.01); *A47J 43/042* (2013.01)

(58) Field of Classification Search
CPC .................................................... A47J 43/105
USPC .......... 366/129, 130, 247; 220/705, 707–709; 215/235–245
See application file for complete search history.

(56) References Cited

U.S. PATENT DOCUMENTS

| 1,279,890 A * | 9/1918 | Lutkiewicz ..................... 74/417 |
| 2,162,348 A | 6/1939 | Hacmac |
| 2,748,946 A * | 6/1956 | Smith ........................... 210/244 |
| 4,930,652 A * | 6/1990 | Murphy et al. ............... 220/706 |
| 5,368,389 A * | 11/1994 | Dedoes ......................... 366/247 |
| 5,456,380 A * | 10/1995 | Ito et al. ....................... 220/713 |
| 5,586,676 A * | 12/1996 | Lynd ............................ 220/212 |
| 5,622,289 A * | 4/1997 | Dedoes ......................... 222/472 |

(Continued)

OTHER PUBLICATIONS

International Search Report for PCT/CH2010/000189, dated Dec. 20, 2010.

*Primary Examiner* — David Sorkin
*Assistant Examiner* — Abbas Rashid
(74) *Attorney, Agent, or Firm* — Sughrue Mion, PLLC

(57) ABSTRACT

The invention relates to a beverage maker, which comprises a container (10) that is open at the top thereof and a lid (20) that covers the container. A removal opening (29) is formed in the lid. A vertical actuation rod (41) passes through the lid. Inside the container, a preparing element (42), for example, a mixing element, is attached to the actuation rod. Outside the container, a grip element (45) is attached to the actuation rod. The grip element can be moved together with the actuation rod between a lower position and an upper position. A closure (30) can be swiveled about a horizontal swivel axis between a closed position that doses the removal opening and a retaining position that releases the removal opening, wherein in the retaining position, the closure fixes the grip element in the lower position thereof. The actuation rod is thereby effectively prevented from sliding out through the removal opening when the beverage is removed.

12 Claims, 3 Drawing Sheets

(56) References Cited

U.S. PATENT DOCUMENTS

| | | | | |
|---|---|---|---|---|
| 5,848,721 A | * | 12/1998 | Cornell et al. | 220/706 |
| 5,894,952 A | * | 4/1999 | Mendenhall et al. | 220/713 |
| 6,086,240 A | * | 7/2000 | Murphy | 366/147 |
| 6,224,253 B1 | * | 5/2001 | Dixon | 366/247 |
| 6,257,428 B1 | * | 7/2001 | Caola | 215/11.1 |
| 6,283,625 B2 | * | 9/2001 | Frankel et al. | 366/146 |
| D449,762 S | * | 10/2001 | Jacober et al. | D7/376 |
| 6,324,966 B1 | | 12/2001 | Joergensen | |
| 6,336,740 B1 | * | 1/2002 | Keough | 366/247 |
| 6,582,116 B2 | * | 6/2003 | Nielsen | 366/279 |
| D510,678 S | * | 10/2005 | Krasne et al. | D7/376 |
| D514,883 S | * | 2/2006 | Tardif et al. | D7/412 |
| D571,610 S | * | 6/2008 | Bodum | D7/399 |
| D587,069 S | | 2/2009 | Bodum | |
| D628,846 S | * | 12/2010 | Bodum | D7/319 |
| 8,057,092 B2 | * | 11/2011 | Ryan et al. | 366/274 |
| 8,313,644 B2 | * | 11/2012 | Harris et al. | 210/198.1 |
| 8,822,209 B2 | * | 9/2014 | Oldenburg et al. | 435/302.1 |
| 2003/0090959 A1 | * | 5/2003 | Mayer | 366/197 |
| 2003/0218935 A1 | * | 11/2003 | Hu | 366/247 |
| 2007/0056447 A1 | * | 3/2007 | Swartz et al. | 99/287 |
| 2008/0259723 A1 | * | 10/2008 | Rhodes et al. | 366/247 |
| 2010/0284243 A1 | * | 11/2010 | Umsonst-Kubler | 366/185 |
| 2010/0302897 A1 | * | 12/2010 | George et al. | 366/130 |
| 2011/0088561 A1 | * | 4/2011 | Bodum | 99/297 |
| 2011/0146496 A1 | * | 6/2011 | Bodum | 99/275 |
| 2011/0309094 A1 | * | 12/2011 | Bodum | 220/715 |

* cited by examiner

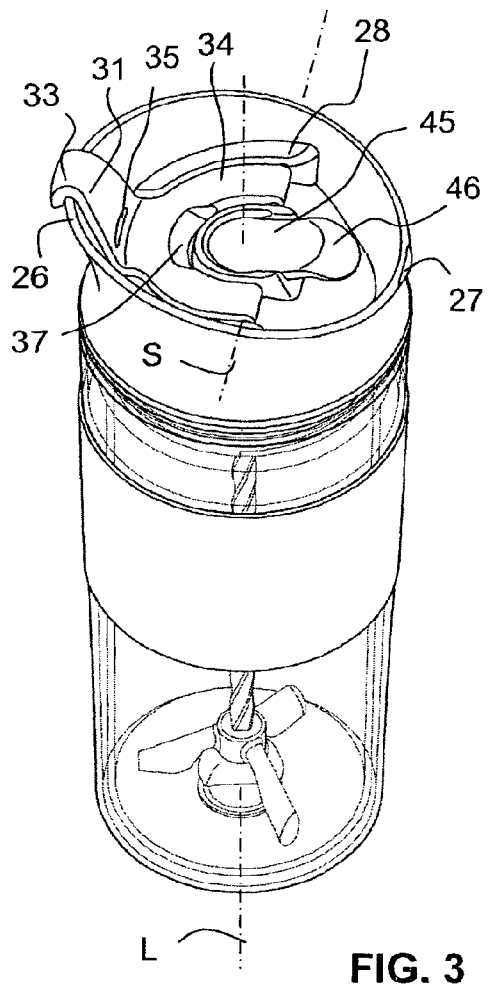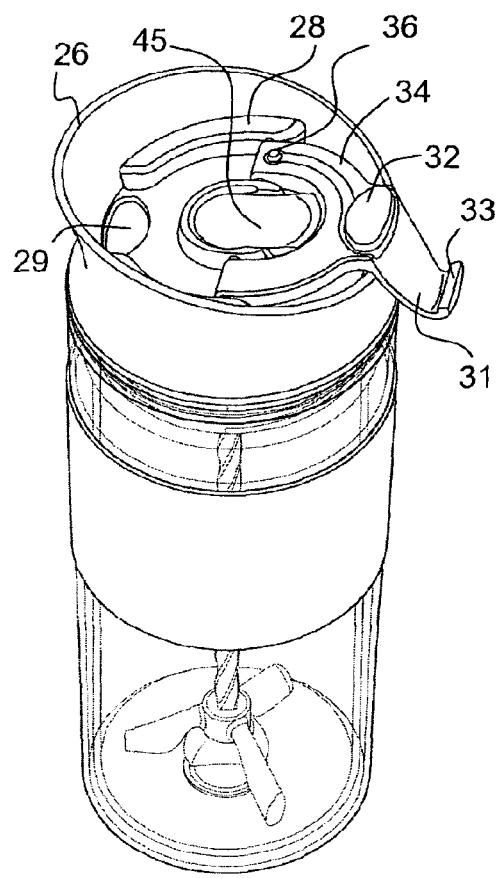
FIG. 3  FIG. 4
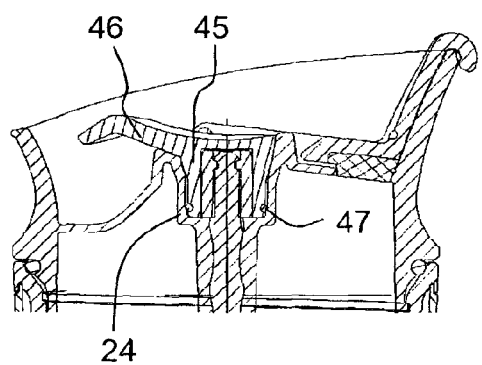
FIG. 5

BEVERAGE MAKER HAVING A LOCKABLE ACTUATION ROD

CROSS REFERENCE TO RELATED APPLICATIONS

This application is a National Stage of International Application No. PCT/CH2011/000189, filed on Aug. 3,2010, which claims priority from Swiss Patent Application No. 00508/10, filed on Apr. 8,2010, the contents of all of which are incorporated herein by reference in their entirety.

TECHNICAL FIELD

The present invention relates to a beverage maker which has a vessel which is open at the top and a lid which covers the vessel and has a removal opening. An actuation rod having a preparation element attached to it, for example a mixing element, a frothing element or a plunger filter, passes through the lid and can be moved between a lower and an upper position with respect to the lid. A closure closes the removal opening in the lid in a closed position. The actuation rod is locked in its lower position by the closure when said closure assumes a retaining position.

PRIOR ART

The prior art discloses plunger-filter coffee makers (often called "French presses") from which the coffee can be immediately drunk after it has been prepared. Coffee makers of this kind are supplied, in particular, by the Bodum® group under the name "Travel Press". A coffee maker of this kind is disclosed in U.S. Pat. No. 6,324,966. The coffee maker has a vessel and a lid which covers the vessel at the top. A drinking opening for the ready coffee is provided in the lid. A plunger rod passes through the lid, with a fine-meshed plunger filter being attached to the lower end of said plunger rod. The plunger filter is pushed downward in the vessel by means of the plunger rod in order to retain the spent coffee grounds in a region of the vessel close to the base after the brewing process. To this end, a grip element is attached to the upper end of the plunger rod. In one embodiment, a closure is connected to the grip element in a pivotable and articulated manner. In a lower position of the plunger rod in which it is completely pushed in, the closure can be pivoted about a horizontal axis between a closed position in which the drinking opening is closed and an opening position in which the drinking opening is open. In another embodiment, the closure is connected directly to the lid in an articulated manner. The lid has a casing wall with a drinking edge which makes it possible to drink the ready coffee directly from the drinking opening. In order to ensure that the grip element of the plunger rod does not create any disturbance during drinking, a recess which accommodates the grip element is formed in the lid. In order to prevent the plunger rod sliding into the face of the user during drinking, a releasable latching connection can be provided between the grip element and the lid. In order to release the latching connection, the user grasps the grip element or, in the case of the corresponding embodiment, the closure, which is connected to the grip element in an articulated manner, in order to pull the grip element upward. However, this operation is somewhat complicated and not completely satisfactory in respect of hygiene.

The prior art also discloses other types of beverage makers which, instead of plunger filters, have other types of preparation elements on an actuation rod, wherein the actuation rod passes through a lid of the vessel. For example, U.S. Pat. No. 2,162,348 discloses a beverage maker which has an actuation rod in the form of a coarse-thread spindle which is guided in a complementary internal thread in the lid of the beverage maker. A grip element in the form of a grip knob is attached to the upper end of the actuation rod in a rotatable manner. A propeller-like mixing element is attached to the lower end of the actuation rod in a rotationally fixed manner. The grip element is alternately pulled upward and pressed downward in order to actuate the mixing element. On account of their threaded guidance, the actuation rod and the mixing element execute a helical movement in this case, that is to say the mixing element rotates and in the process simultaneously moves upward or downward, in order to thoroughly mix the contents of the vessel. In order to prevent the actuation rod from slipping out when the beverage is poured, a closure is provided on the lid, said closure closing a removal opening in the lid in a closed position and opening the removal opening in a retaining position and, at the same time, locking the grip element in its lowermost position. To this end, the closure can be horizontally displaced between the closed position and the retaining position, wherein it engages over an annular flange which is formed at the lower border of the grip element and locks said annular flange against moving vertically upward in the retaining position. However, if the grip element is not in its lowermost position, the closure can nevertheless be actuated, without the grip element being locked, and the actuation rod can nevertheless slip out during pouring in the event of incorrect operation of this kind.

SUMMARY OF THE INVENTION

It is therefore an object of the present invention to specify a beverage maker having a preparation element on an actuation rod, in which the actuation rod can be locked in a simple and reliable manner for the purpose of removing the beverage, and incorrect operations can be avoided.

The invention therefore specifies a beverage maker which has:
- a vessel which is open at the top;
- a lid which covers the vessel and in which a removal opening is formed;
- an actuation rod which extends into the vessel through a central passage opening in the lid and which defines a longitudinal axis;
- a preparation element which is attached to the actuation rod, preferably to the lower end of said actuation rod, inside the vessel;
- a grip element which is attached to the actuation rod, preferably to the upper end of said actuation rod, outside the vessel and which, together with the actuation rod, is movable between a lower position close to the lid and an upper position remote from the lid, and
- a closure which is connected in a movable manner to the lid and which is movable between a closed position in which the removal opening is closed and a retaining position in which the removal opening is open.

The closure fixes the grip element in its lower position in the retaining position. As a result, the actuation rod is effectively locked. In order to achieve this fixing, the closure is designed such that it is pivotable with respect to the lid between the closed position and the retaining position about a horizontal pivot axis which runs transverse to the longitudinal axis. As a result, it is possible to design the closure such that it can be pivoted into the retaining position only when the grip element is in its lower position since, otherwise, the actuation rod would get in the way. To this end, the closure can preferably be pivoted over the grip element from the closed position to the retaining position when the grip element is in or close to its lower position.

The closure is preferably designed such that it at least partially covers the grip element at the top in the retaining position and as a result locks it. To this end, the grip element can be designed to be asymmetrical with respect to the longitudinal axis, so that said grip element has a region close to the axis and a region which projects from the region close to the axis transverse to the longitudinal axis and faces away, for example, from the removal opening of the lid in the retaining position. This projecting region then preferably runs at a distance from the lid (in particular from a top wall of the lid) in the lower position of the grip element in order to make it easier for the finger of a user to operate the grip element. The closure then preferably at least partially covers the projecting region of the grip element in the retaining position. However, in other refinements, the closure can also cover, and thereby fix, the grip element in another region, for example in a region which is offset through approximately 90° about the longitudinal axis in relation to the removal opening, or the closure can clamp into the grip element at its radial outer face instead of covering it.

At least a first latching structure is preferably formed on the closure in order to latch the closure to the cover in a releasable manner in the retaining position. The first latching structure may be, in particular, a recess in the form of a latching notch in the closure, which latching notch can be latched to a rear border region of the lid in the retaining position.

In addition, preferably at least a second latching structure is formed on the closure in order to also latch the closure to the lid in a releasable manner in the closed position. In this case, it has proven expedient when the closure has a protruding actuation region, and when the second latching structure is formed by a portion of the actuation region which is bent forward in the manner of a hook and which covers a front border region of the lid in the closed position and latches with said front border region in a releasable manner. The first latching structure is then preferably formed in a rear portion of the actuation region which is closer to the longitudinal axis than the second latching structure. In this case, the actuation region extends substantially along a direction which faces both upward and radially outward with respect the longitudinal axis, that is to say obliquely upward, in the closed position, and in the process rests against a casing wall of the cover which at least partially surrounds a top wall of the lid. As will be described further below, this casing wall can widen toward the top and, by way of its front border region, form a drinking edge. In embodiments of this kind, the second latching structure therefore latches with the front border region of the casing wall when the closure is in the closed position, and the first latching structure then preferably latches with a rear border region of the casing wall, which is situated radially opposite the front border region, when the closure is in the retaining position.

The pivot axis preferably runs behind the longitudinal axis as seen from the removal opening, that is to say it is at a greater minimum distance from the removal opening than the longitudinal axis. This facilitates design of the closure such that it projects over the lid toward the rear by way of its actuation region in the retaining position, so that it can be easily released from the retaining position again. In addition, this rearward arrangement of the pivot axis leads to the pivot region of the closure being only very small when the actuation rod is withdrawn, so that it is not possible to inadvertently remove the beverage from the vessel when the actuation rod is fully or partially withdrawn.

The lid is preferably designed such that it is possible to drink the ready beverage directly through the removal opening. To this end, the lid then has a drinking edge at least in a front border region, said drinking edge being designed to guide a beverage which can be removed through the removal opening (which can then be called a drinking opening) directly to the mouth by means of the drinking edge. The drinking edge is preferably formed by the upper border of a casing wall of the cover which widens toward the top, that is to say therefore runs obliquely upward and outward, as has already been described above. However, as an alternative, it is also feasible for the lid to be designed in such a way that the ready beverage can be poured out through the removal opening. In this case, a lip-like spout is preferably formed on the lid.

In order to ensure that the grip element does not create any disturbance during drinking or pouring, a recess which at least partially accommodates the grip element in the lower position of the grip element is formed in the lid (preferably in the top wall of the lid). In the case of the asymmetrical design of the grip element having a projecting region specified above, this region then preferably projects out of the recess in order to facilitate operation of the grip element. A peripheral seal can optionally additionally be formed on the grip element and/or on the recess in order to seal the grip element with respect to the recess. A peripheral seal is preferably likewise present between the vessel and the cover, so that the entire beverage maker is closed off in a liquid-tight manner in the closed position of the closure.

The closure preferably has a substantially rigid support and a closure body which is connected to said support and can project, for example, into the removal opening or can rest on the cover so as to surround the removal opening and, in the process, closes the removal opening in a sealing manner. In particular, this closure body can be produced from a softer material than the support and, for example, be injection-molded onto the support in a two-component injection-molding process. The support preferably has two arms which are guided from the closure body past the passage opening (and therefore the actuation rod) on both sides and of which the free ends are connected to the lid in a pivotable manner in the region of the pivot axis. A spring element can also be formed on the support (or on the lid) at a distance from the closure body, said spring element acting on the closure in the direction to the retaining position by way of a spring force in the closed position. This facilitates pivoting of the closure from the closed position to the retaining position after the latching connection between the second latching structure and the lid is released. This spring element can likewise be produced from a softer material than the support, in particular from the same material as the closure body, and can be injection-molded on the support together with said closure body.

The beverage maker can be provided, in particular, in the form of a mixing apparatus for preparing mixed milk beverages, for example cocoa, or beverages made from soluble powders, for example soluble coffee or soluble mixed coffee beverages such as cappuccino blends. To this end, the actuation rod can be in the form of a coarse-thread spindle with an external thread, and an internal thread which complements the external thread can be formed in the passage opening in the lid. The internal thread can be formed, in particular, in a region of the lid which serves as a bearing sleeve. This region is preferably formed beneath the abovementioned recess for (partially) accommodating the grip element. The coarse-thread spindle has a thread pitch which is large enough that a force which acts along the longitudinal axis leads to a torque about the longitudinal axis in such a way that, as a result, the coarse-thread spindle is made to rotate while at the same time moving upward or downward. To this end, the coarse-thread spindle preferably has a ratio of thread pitch P to diameter D of P/D>5. It can have one turn or several turns and preferably has three turns.

In order to ensure that the grip element does not rotate together with the actuation rod during the helical movement of said actuation rod, the grip element is preferably attached to the actuation rod such that it is rotatable about the longitudinal axis.

The preparation element is preferably a mixing or stirring element which is rigidly connected to the actuation rod and has at least one mixing arm which extends outward from the threaded spindle transverse to the longitudinal axis, preferably at least two, in particular three, such mixing arms which can be arranged in the manner of a propeller and are each inclined at a setting angle to the horizontal. It goes without saying that other types of mixing or stirring elements are also possible.

As an alternative, the preparation element can also be a plunger with a fine-meshed screen which extends transverse to the longitudinal axis. In this case, the beverage maker can be in the form of, for example, a plunger-filter coffee maker, in particular in the form of a "travel mug", or else as a milk frother. Depending on the application, the actuation rod can be designed as a simple plunger rod or as a threaded spindle. Other types of preparation elements, for example in the form of a whisk with wire loops, are likewise possible.

BRIEF DESCRIPTION OF THE DRAWINGS

Preferred embodiments of the invention will be described below with reference to the drawings which serve merely for illustrative purposes and are not to be interpreted as being restrictive. In the drawings:

FIG. 3 shows a perspective view of the beverage maker in which the closure can be seen in its closed position;

FIG. 4 shows a perspective view of the beverage maker in which the closure can be seen in its retaining position; and FIG. 5 shows a central longitudinal section through the lid region of a beverage maker according to the invention in line with a second embodiment.

DESCRIPTION OF PREFERRED EMBODIMENTS

Figure 1:
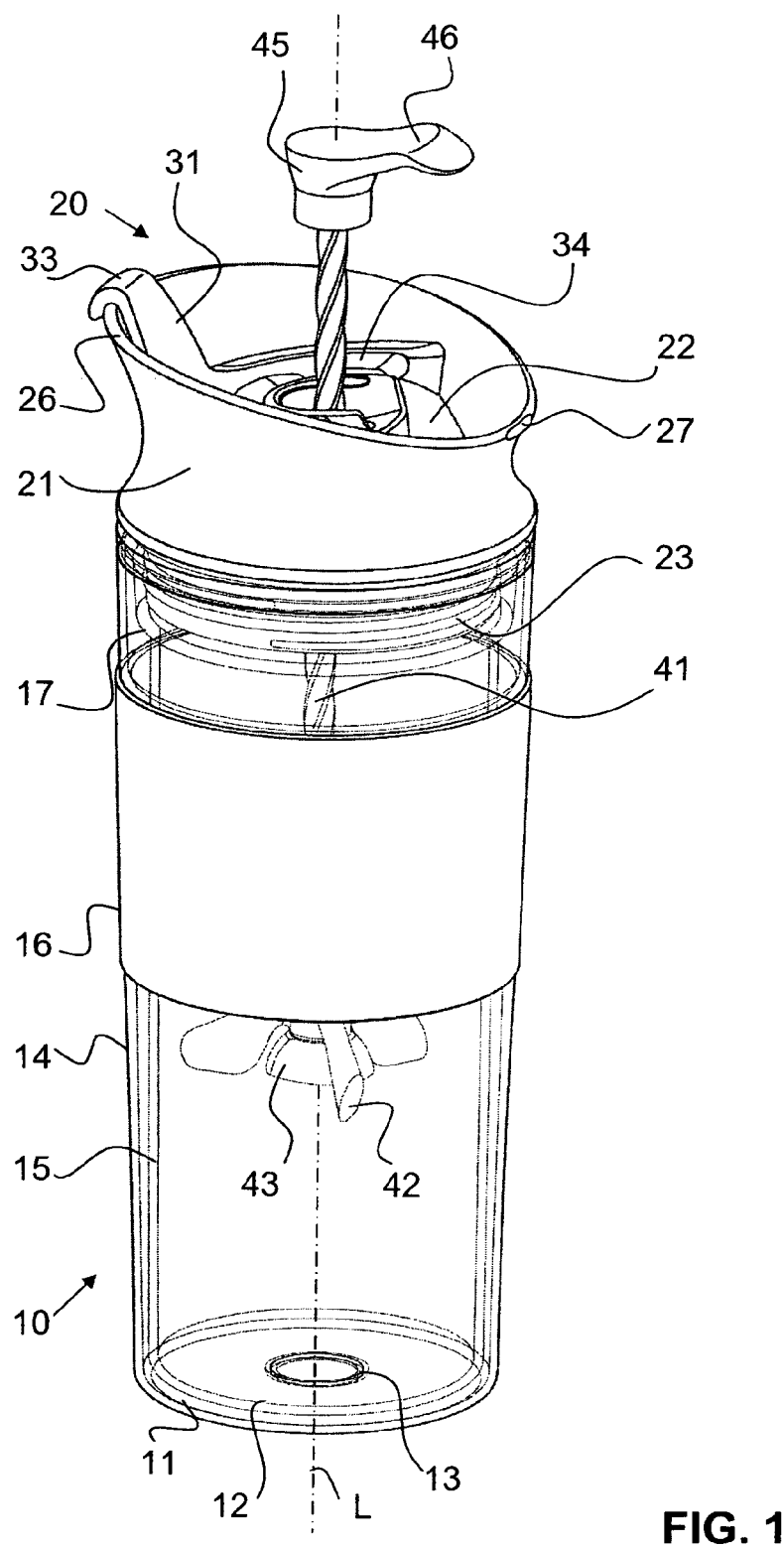
FIG. 1 shows a perspective view of a beverage maker according to the invention in line with a first embodiment.
Figure 2:
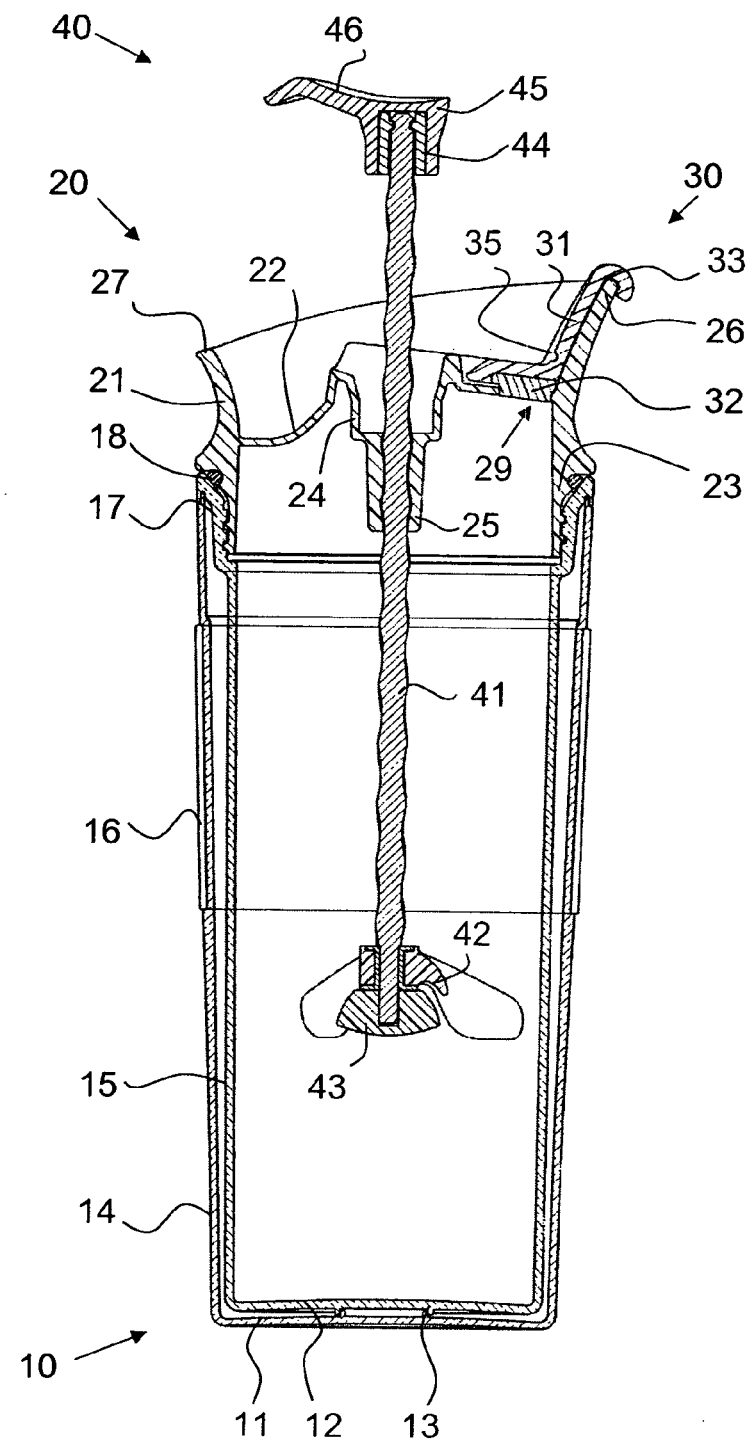
FIG. 2 shows a central longitudinal section through the beverage maker of FIG. 1.

FIGS. 1 to 4 illustrate a beverage maker according to the invention in line with a first embodiment. The beverage maker comprises a double-walled vessel 10 which is composed of a transparent plastic, having an outer base 11, an inner base 12, an outer side wall 14 and an inner side wall 15. The inner base 12 rests on the outer base 11 in an annular connection region 13. The outer side wall 14 and the inner side wall 15 are connected to one another, in particular welded to one another, in their upper border region. A collar 16 which is composed of a relatively soft material, for example silicone rubber, is situated in a slight recess in the outer side wall 14 on the outer face thereof and surrounds the outer side wall 14 in this region. An internal thread 17 for connecting the vessel 10 to the lid 20 is formed in an upper edge region of the inner side wall 15.

The lid 20 has a peripheral casing wall 21 which widens toward the top. The casing wall extends further upward in a front border region, which forms a drinking edge 26, than in a rear border region 27. The casing wall 21 surrounds a top wall 22 in which a removal opening which serves as a drinking opening 29 adjoins the front region of the casing wall. An external thread 23 which engages in the internal thread 17 of the vessel 10 is formed on the outer face of the casing wall 21 beneath the top wall 22. A sealing ring 18 seals the lid 20 with respect to the vessel 10. A recess 24 for accommodating a grip element 45, which will be described in greater detail below, is formed in the top wall 22. A guide sleeve 25 is formed beneath the recess, said guide sleeve serving to guide an actuation rod in the form of a threaded spindle, which will be described in greater detail below, and to this end has an internal thread. In this case, the guide sleeve 25 delimits a vertical passage opening for the threaded spindle 41.

The threaded spindle 41 is part of a mixing unit 40 and defines a vertical longitudinal axis L by way of its longitudinal direction. On its outer face, said threaded spindle has a coarse thread with several turns (in this case three turns), the ratio of the thread pitch to the diameter being considerably more than 5 in this case. The internal thread of the guide sleeve 25 is accordingly designed to complement this coarse thread. At its lower end, the threaded spindle 41 is fixedly connected to a mixing element 42 in the form of a three-blade propeller. A securing nut 43 is screwed onto the lower end of the threaded spindle 41 and fixes the mixing element 42 to the threaded spindle. The securing nut 43 can be detached for cleaning purposes. As a result, the mixing element 42 can be removed from the threaded spindle 41. At its upper end, the threaded spindle 41 is connected to a grip element 45 in a rotatable manner. To this end, the grip element 45 is seated on a bushing 44 which is attached to the threaded spindle 41 in a rotatable manner. The grip element 45 is asymmetrical, having a rotationally symmetrical central region which widens slightly toward the top and is close to the axis, and a grip region 46 which projects from said region transverse to the longitudinal axis L and facilitates operation of the grip element 45. At its free end, the grip region 46 is angled slightly downward.

The mixing unit 40 can be moved up and down in relation to the lid 20 with the aid of the grip element 45. In this case, the threaded spindle 41 is guided in the guide sleeve 25 in such a way that it executes a helical movement about the longitudinal direction when it is pushed or pulled along the longitudinal direction. As a result, the mixing element 42 also executes a helical movement, that is to say a superimposition from a translation along the longitudinal axis and a rotation about the longitudinal axis. Since the grip element 45 is attached to the threaded spindle 41 in a rotatable manner, the grip element 45 does not need to execute the rotary movement as well and can be guided by the user with any desired orientation in relation to the vessel 10 and lid 20.

In its lowermost position, the grip element 45 is partially accommodated in the recess 24 in the lid 20 when the projecting grip region 46 extends in a radial direction which faces away from the drinking opening 29. In this case, the grip region 46 runs at a distance from the top wall 22 of the lid which runs downward in a pre-curved manner in this region. In order to pull the grip element 45 out of the recess 24 again, the grip element 45 can, as a result, be readily grasped in the grip region 46 from below by a finger of the user and pulled up again.

A closure 30 is connected to the lid 20 in an articulated manner such that it can pivot about a horizontal pivot axis S (FIG. 3). The pivot axis S runs close to the center but on a side of the longitudinal axis L which faces away from the drinking opening 29. The closure 30 comprises a support 34 which is composed of a dimensionally stable material and has a closure body 32 (FIG. 4), which is composed of a relatively soft, elastically deformable material, formed on its lower face by means of a two-component injection-molding process. A spring element 36 (FIG. 4) which is composed of the same elastically deformable material is also formed on the lower face of the support 34 at a distance from the closure body 32, said spring element being connected to the closure body 32 by means of a material bridge and serving to subject the closure to the action of a spring force slightly toward the top in the position shown in FIG. 3. The support 34 has two arms which extend from the closure body 32, in each case by a quarter of a circle in the horizontal, about the longitudinal axis L when the closure is in the position shown in FIG. 3. The free ends of the arms are in each case connected to the lid by means of two laterally protruding pin regions such that they can pivot about the pivot axis S. The support also has a protruding actuation region 31 which projects obliquely forward and upward from the remainder of the support in the position shown in FIG. 3 and rests against the casing wall 21 of the lid 20. A hook-like structure 33 is formed at the free end of the actuation region 31, said hook-like structure projecting over the drinking edge 26 in the position shown in FIG. 3 and establishing a releasable latching connection with the drinking edge 26. As a result, the closure can be secured to the lid in a releasable manner in the position shown in FIG. 3. The closure body 32 closes the drinking opening 29 in this position. This position is therefore called the closed position in the text which follows. Two flank regions 28 of the lid 20 laterally flank the closure 30 in this position.

In the lower position of the mixing unit 40, that is to say when the grip element 45 is in the recess 24, the closure 30 can be pivoted from the closed position to a retaining position which is illustrated in FIG. 4. In this case, the closure 30 is pivoted over the grip element 45. In the retaining position, the closure 30 opens the drinking opening 29 and at the same time fixes the mixing unit 40 in such a way that it cannot move upward out of the lower position. To this end, the closure 30 covers the projecting grip region 46 of the grip element 45 in the region of its free end which is angled downward. To this end, the support 34 of the closure 30 is provided with a bevel 37 (FIG. 3) on its side which is averted from the closure body 32. The closure 30 is latched to a rear border region 27 of the casing wall 21 of the lid in this position. To this end, a latching notch 35 is formed on the actuation region 31 of the closure 30, said latching notch being situated closer to the pivot axis S than the hook-like structure 33 on account of the slightly decentralized arrangement of the pivot axis S.

In order to prepare a beverage, the user fills the open vessel 10 with the ingredients, in the case of soluble coffee, for example, with soluble coffee powder to which further ingredients such as milk powder and sugar may be added if desired, and pours water or another liquid, for example milk, onto them. Said user then places the lid 20 onto the vessel 10 and screws it tightly into the vessel 10. The user now operates the grip element 45 and moves the mixing unit 40 up and down. As a result, the threaded spindle 41 and the mixing element 42 perform the abovementioned helical movement and thereby thoroughly mix the ingredients of the beverage. In this case, the closure 30 is in the closed position in order to prevent the beverage from splashing out. In order to then drink the beverage, the user moves the mixing unit 40 to its lower position and pivots the closure 30 to the retaining position, initially assisted by the spring element 36. In the retaining position, the closure 30 locks the mixing unit 40 in the lower position. The user can now conveniently drink the beverage via the drinking opening 29 and the drinking edge 26 without being impeded by the mixing unit 40 in the process and without there being a risk of the mixing unit 40 suddenly slipping out of the lid. In the process, the double-walled design of the vessel helps the beverage retain its temperature over a relatively long period of time.

FIG. 5 illustrates a second embodiment of the invention which represents a variant of the first embodiment. In this case, identically acting parts are provided with the same reference symbols as in FIGS. 1-4. This embodiment differs from the first embodiment in that the grip element 45 has a peripheral sealing element 47 in the form of an O-ring in its region close to the axis, said sealing element, together with the recess 24, creating a seal between the grip element 45 and the lid 20.

It goes without saying that a large number of modifications are possible without departing from the scope of the invention, and the invention is in no way restricted to the above exemplary embodiments.

Therefore, in particular, the vessel does not have to be double-walled and/or transparent. The lid does not have to be designed such that it is possible to drink directly from the vessel, but rather can also be designed for pouring the beverage. The vessel can be provided with a handle, for example. A large number of other types of closure are possible without the fundamental manner of operation of the closure having to be changed. In particular, it is feasible here for the closure to be connected to the lid in an articulated manner only on one side of the longitudinal axis, and therefore the closure can have an asymmetrical basic shape. The closure body can likewise be of different design and, for example, form a peripheral sealing lip which surrounds the removal opening. The preparation unit can have different preparation elements to the propeller-like mixing element illustrated here, for example a screen element, a wire loop arrangement etc. The grip element of the preparation unit and the recess in the lid for accommodating said grip element can have various different shapes. In this case, the grip element can be fixed in a lateral region which is offset by less than 180° from the removal opening, instead of in a rear region which is averted from the removal opening. A large number of further modifications is possible.

List Of Reference Symbols

10 Vessel
11 Outer base
12 Inner base
13 Connecting region
14 Outer side wall
15 Inner side wall
16 Collar
17 Internal thread
20 Lid
21 Casing wall
22 Top wall
23 External thread
24 Recess
25 Guide sleeve
26 Drinking edge
27 Rear edge region
28 Flank region
29 Drinking opening
30 Closure
31 Operating region
32 Closure body
33 Hook-like region
34 Support
35 Latching notch 36 Spring element
37 Bevel
40 Mixing unit
41 Threaded spindle
42 Mixing element
43 Securing nut
44 Bushing
45 Grip element
46 Grip region
47 Sealing element

The invention claimed is:

1. A beverage maker having:
   a vessel which is open at the top;
   a lid which covers the vessel and in which a removal opening is formed;
   an actuation rod which extends into the vessel through a passage opening in the lid and which defines a longitudinal axis;
   a preparation element which is attached to the actuation rod inside the vessel;
   a grip element which is attached to the actuation rod outside the vessel and which, together with the actuation rod, is movable between a lower position close to the lid and an upper position remote from the lid, and
   a closure which is connected in a movable manner to the lid and which is pivotable with respect to the lid between a closed position in which the removal opening is closed and a retaining position in which the removal opening is open about a horizontal pivot axis which runs transverse to the longitudinal axis,
   wherein the grip element is fixed in its lower position in the retaining position of the closure,
   wherein at least a first latching structure is formed on the closure in order to latch the closure to the lid in a releasable manner in the retaining position,
   wherein the closure has a closure body for closing the removal opening,
   wherein the closure has two arms which are guided from the closure body past the passage opening on both sides and of which the free ends are connected to the lid in a pivotable manner in the region of the pivot axis, and
   wherein the pivot axis is at a greater distance from the removal opening than the longitudinal axis.

2. The beverage maker as claimed in claim 1, wherein the closure is pivotable over the grip element from the closed position to the retaining position, when the grip element is in its lower position.

3. The beverage maker as claimed in claim 1, wherein the closure at least partially covers the grip element at the top in the retaining position.

4. The beverage maker as claimed in claim 3, wherein the grip element has a region close to the axis and a region which projects from the region close to the axis transverse to the longitudinal axis, and wherein the closure at least partially covers the projecting region of the grip element in the retaining position.

5. The beverage maker as claimed in claim 1, wherein the first latching structure comprises a latching notch which can be latched to a rear border region of the lid in the retaining position.

6. The beverage maker as claimed in claim 1, wherein at least a second latching structure is formed on the closure in order to latch the closure to the lid in a releasable manner in the closed position.

7. The beverage maker as claimed in claim 6, wherein the closure has a protruding actuation region, and wherein the second latching structure is formed by a portion of the actuation region which is bent in the manner of a hook and which covers a front border region of the lid in the closed position and latches with said front border region in a releasable manner.

8. The beverage maker as claimed in claim 1, wherein the lid has a drinking edge in a front border region, said drinking edge being designed to guide a beverage which can be removed through the removal opening directly to a mouth of a user by means of the drinking edge.

9. The beverage maker as claimed in claim 1, wherein a recess is formed in the lid, said recess at least partially accommodating at least a region of the grip element, which region is close to the axis, in the lower position of the grip element.

10. The beverage maker as claimed in claim 1, wherein the actuation rod is in the form of a threaded spindle with an external thread, and an internal thread which complements the external thread is formed in the passage opening of the lid.

11. The beverage maker as claimed in claim 10, wherein the grip element is attached to the actuation rod such that it is rotatable about the longitudinal axis.

12. The beverage maker as claimed in claim 10, wherein the preparation element is in the form of a mixing element having at least one stirring arm which extends outward from the actuation rod transverse to the longitudinal axis.

* * * * *